Dec. 4, 1923.  
F. S. MORGAN  
SLUICE BOX  
Filed May 22, 1922  
1,476,169
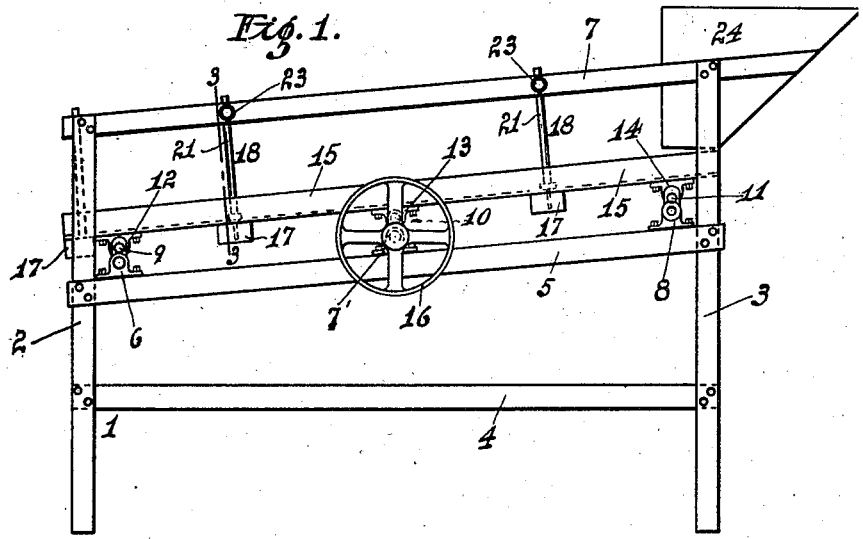
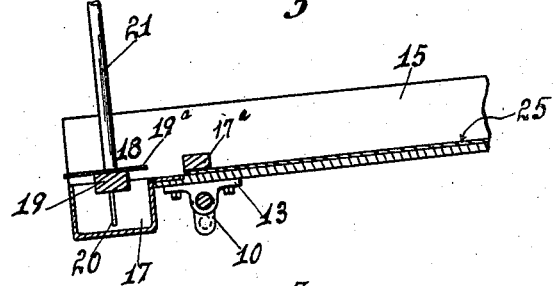
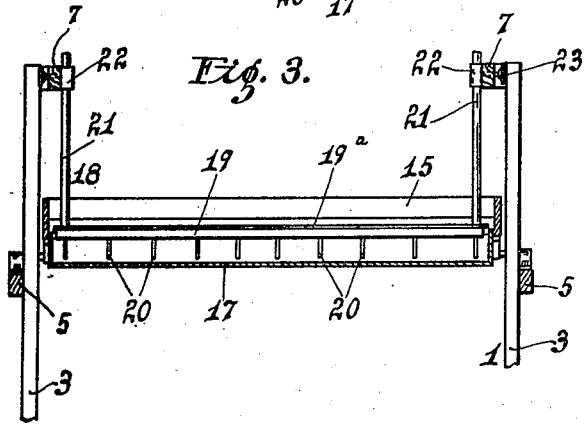
Inventor.  
Frank S. Morgan.  
By Harry C. Schroeder  
Attorney.

Patented Dec. 4, 1923.

1,476,169

UNITED STATES PATENT OFFICE.

FRANK S. MORGAN, OF BERKELEY, CALIFORNIA.

SLUICE BOX.

Application filed May 22, 1922. Serial No. 562,642.

*To all whom it may concern:*

Be it known that I, FRANK S. MORGAN, a citizen of the United States, residing at Berkeley, in the county of Alameda and State of California, have invented certain new and useful Improvements in Sluice Boxes, of which the following is a specification.

My invention is an improved sluice box for separating metals such as gold or platinum from the dirt which is pumped thereinto by a mining dredge, or other suitable means.

Referring to the annexed drawing in which my invention is illustrated and which forms a part of this specification:

Figure 1 is a side elevation of my sluice box.

Figure 2 is a fragmentary longitudinal section of the lower end portion of my sluice box.

Figure 3 is a transverse vertical section of my sluice box taken on line 3—3 of Figure 1.

In the drawing 1 indicates a frame comprising standards 2 and 3, horizontal bars 4 connected at their ends to the lower part of said standards, and superimposed inclined bars 5 and 7 connected at their upper ends to the standards and inclining downwardly slightly from the standards 3 to the standards 2. On the bars 5 are mounted bearings 6, 7' and 8, the bearings 6 and 8 being respectively mounted near the ends of said bars, and the bearings 7' being mounted intermediate the ends of said bars. In the bearings 6, 7' and 8 are journaled short radius cranks 9, 10 and 11 respectively on which cranks are respectively journaled bearings 12, 13 and 14, and on which bearings is mounted an inclined sluice trough 15. On the end of crank 10 is secured a pulley 16 to which power is applied to rotate said crank and to raise and lower and reciprocate said trough. In the bottom of the sluice trough 15 are a plurality of transverse traps 17, one of said traps being near the right end of said trough, another trap being at the left end of said trough and another trap being located between said first two traps. A cleat 17$^a$ is secured to the trough 15 in front of each trap to break the flow of water, and compel it to fall into the traps 17. Rakes 18 corresponding in number to the number of traps 17 are mounted within the upper part of the frame 1. Each of said rakes comprises a horizontal bar 19, teeth 20 on said bar extending into a trap 17, and vertical rods 21—21 upstanding from the ends of said bar respectively and adjustably secured at their upper ends in brackets 22—22 on the inside of bars 7—7 by set screws 23—23 seated in said bars 7—7 whereby the rake may be adjusted to different heights with relation to the trap. A flexible strip 19$^a$ to assist in settling the dirt carried by the water. As the water comes in contact with the strip, due to the vibration of the box, the heavier particles of dirt and metal are thrown to the bottom. A hopper 24 is mounted in the upper right end of the frame 1 above the upper right end of the sluice trough 15 for delivering the dirt to said end of the trough. The bottom of the trough 15 may, if desirable, be lined with a copper plate 25. The movement of the trough 15 causes the rake to change its position in the traps 17 whereby the dirt which falls in said traps is agitated so that the lighter sand and mud passes out of the traps while the heavier metal deposits in the traps.

Having described my invention, I claim:

1. In a sluice box, a frame, a plurality of short radius cranks journaled on said frame, and adapted to be rotated a sluice trough mounted on said cranks, traps in the bottom of said sluice trough, rakes mounted on said frame and extending into said troughs to agitate the dirt therein as the trough is raised and lowered and reciprocated by said cranks, and flexible strips secured on said rakes above the trap, said strips lying in a plane parallel to the plane of the bottom of the trap and extending on both sides of the rakes.

2. In a sluice box, a frame, a plurality of short radius cranks journaled on said frame and adapted to be rotated, a sluice trough mounted on said cranks, traps in the bottom of said sluice trough, rakes mounted on said frame and extending into said troughs to agitate the dirt therein as the trough is raised and lowered and reciprocated by said cranks and flexible strips secured on said rakes above the traps, said strips lying in a plane parallel to the plane of the bottom of the trap.

3. In a sluice box, a frame, a sluice trough mounted on said frame and adapted to be raised and lowered and to be moved longitudinally, traps in the bottom of said trough, cleats secured to the bottom of said trough in front of said traps, rakes mounted on said frame and extending respectively into said troughs for agitating the dirt therein, and flexible strips secured to said rakes above the traps.

4. In a sluice box, a frame, a plurality of rotatable cranks on the frame whereby the box may be gyrated, a trap in the bottom of the box, and an adjustable rake extending into the trap whereby the dirt therein may be agitated.

5. In a sluice box, a frame, a plurality of cranks on the frame whereby the box may be gyrated, a trap in the bottom of the box, an adjustable rake extending into the trap for agitating the dirt therein and a cleat extending across the box and resting on the floor thereof to retard the water in the box.

In testimony whereof I affix my signature.

FRANK S. MORGAN.